(12) United States Patent
Montagne

(10) Patent No.: US 9,366,188 B2
(45) Date of Patent: Jun. 14, 2016

(54) GAS TURBINE SEQUENCE PURGING PROCESS

(71) Applicant: GE ENERGY PRODUCTS FRANCE SNC, Belfort (FR)

(72) Inventor: Pierre Montagne, Lay Saint Christophe (FR)

(73) Assignee: GE ENERGY PRODUCTS FRANCE SNC, Belfort (FR)

( * ) Notice: Subject to any disclaimer, the term of this patent is extended or adjusted under 35 U.S.C. 154(b) by 523 days.

(21) Appl. No.: 13/801,525

(22) Filed: Mar. 13, 2013

(65) Prior Publication Data

US 2013/0276452 A1 Oct. 24, 2013

(30) Foreign Application Priority Data

Apr. 18, 2012 (FR) ...................................... 12 53559

(51) Int. Cl.
*F02C 7/22* (2006.01)
*F02C 9/00* (2006.01)
*F01D 21/00* (2006.01)

(52) U.S. Cl.
CPC . *F02C 7/22* (2013.01); *F01D 21/00* (2013.01); *F02C 9/00* (2013.01)

(58) Field of Classification Search
CPC ............ F02C 7/22; F02C 7/222; F02C 7/232; F02C 9/00; F01D 21/00; F05D 2260/602
See application file for complete search history.

(56) References Cited

U.S. PATENT DOCUMENTS

| 6,449,955 | B2* | 9/2002 | Tanaka | F02C 3/22 60/39.094 |
|---|---|---|---|---|
| 2001/0022080 | A1 | 9/2001 | Tanaka et al. | |
| 2009/0272118 | A1 | 11/2009 | Alexander et al. | |
| 2011/0036092 | A1 | 2/2011 | Lawson et al. | |
| 2011/0040469 | A1* | 2/2011 | Singh | F23R 3/26 701/100 |
| 2013/0118178 | A1* | 5/2013 | Sabelhaus et al. | 60/772 |
| 2013/0186057 | A1* | 7/2013 | Shanmugam | F23R 3/36 60/39.463 |
| 2013/0219909 | A1* | 8/2013 | Nenmeni | F02C 7/232 60/775 |
| 2014/0099584 | A1* | 4/2014 | Bobba | F23R 3/002 431/207 |

FOREIGN PATENT DOCUMENTS

| JP | 11210494 | 8/1999 |
| JP | 2002013418 | 1/2002 |
| JP | 2002129981 | 5/2002 |
| JP | 201065579 | 3/2010 |

* cited by examiner

*Primary Examiner* — Carlos A Rivera
(74) *Attorney, Agent, or Firm* — Nixon & Vanderhye P.C.

(57) ABSTRACT

A purge process of a gas turbine supply pipe network provided with fuel (diesel or natural gas) at least partly containing synthesis gas comprises of injection of inert gas in intervalve portions or collectors of the pipe network likely to contain fuel when the fuel supply is stopped. The injection of gas is implemented in the said portions of the network according to a sequence of respective injection.

10 Claims, 4 Drawing Sheets

| Configuration | Mode of operation and purge sequence | | | |
|---|---|---|---|---|
| | "Transfer In" | "Transfer out" | "Trip/Start Up" | "Shutdown" |
| Config 1 | I2 ; I1 | I2 ; I1 | I2 ; I1 | - |
| Config 2 | I8 ; I9 ; I7 ; I6 | I8 ; I7 ; I9 | I8 + I9 ; I7 ; I6 ; I5 | I9 |
| Config 3 | I14 ; I13 ; I12 | I14 ; I13 | I14 + I15 ; I12 ; I13 | I15 |
| Config 4 | I18 ; I17 ; I20 | I18 ; I20 ; I17 | I18 ; I20 ; I17 | - |

GAS TURBINE SEQUENCE PURGING PROCESS

This invention concerns, in general, the gas turbines and, more particularly, the gas turbines supplied with fuel containing synthetic gas.

BACKGROUND AND SUMMARY OF THE INVENTION

As known, the gas turbines of this type can be powered, according to their operating cycle, either with natural gas or synthetic gas, or on synthetic gas. The use of synthetic gas for the supply of gas turbines causes relatively high risks of auto-inflammation, when a non-controlled air and synthetic gas mixture subsists in the supply pipes.

This is the reason for which it is necessary to implement two purge phases of the portions of the supply network of the turbines by injecting an inert gas, as for example carbon dioxide or nitrogen dioxide.

For example, when they are not supplied with fuel, the turbine gas injectors must be swept by hot air from the outlet of the turbine compressor. In order to avoid any contact between hot air, whose temperature can attain 400° C., and synthetic gas, we implement a purge of the portions of pipes likely to contain synthetic gas, by injection of inert gas. It particularly consist in injecting inert gas in the portions of supply pipes located between two control valves, generally referred to by the term "cavity", or in the collectors or distributors, generally referred to by the term "manifold" for the supply of fuel injectors or combustive combustion chamber.

It is already known, from the state of the technique, inert gas injection techniques in a gas turbine supply network.

In this regard we can refer to the document JP 2002 129 981 or JP 11 210 494 in which inert gas is injected between two supply valves of the turbine with fuel, particularly when the supply is cut off.

It is also known from the document JP 2010 065 579 to inject in a fuel supply pipe, before ignition of the turbine combustion chamber.

We can also refer to the document US 2001/0 022 080 which also describes an inert gas injection process according to the pressure existing in a supply pipe of a turbine with fuel.

The document US 20110036092 also concerns a supply procedure of a gas turbine supply network distributor capable of implementing the purge sequences.

Moreover, the inert gas used to implement the purge phase, is provided in tanks designed in a manner as to respect a specific pressure range lying between a minimum pressure which must be greater than the pressure likely to exist in the entire supply network in order to avoid return of toxic gas and whose maximum pressure must be less than the maximum pressure acceptable for various elements constitutive of the supply network.

As shown in FIG. 1, it was observed that when the purge phase of the various portions of the supply network is implemented, the inert gas pressure provided by a storage tank upstream of the supply network falls suddenly due to the establishing of a high inert gas flow in the lines to purge and this, in spite of the presence of flow control valves, duly set, and a pressure regulation system of the inert gas tanks.

The pressure regulation system of the tank is capable of resetting the pressure, after sudden drop. However, this pressure resetting is not sufficiently reactive to satisfy the safety criteria generally imposed at the production power plants using gas turbines.

During the transitory pressure drop, the inert gas supply pressure is likely to pass below the safety protection levels based on the fuel gas pressure and hot air pressure, leading to an emergency stop of the gas turbine and consecutive loss of production.

The aim of the invention is thus to compensate for this inconvenience and, consequently, propose a purge process of the supply pipe network of a gas turbine powered with a fuel at least partly containing synthetic gas, by inert gas injection in the portions of the pipe network likely to contain fuel or hot air in order to avoid contact between fuel and hot air when the fuel supply is stopped.

According to a general characteristic of this process, inert gas is injected in the said portions of the network according to a sequence of respective injections.

The supply of the said portions of the network according to a predetermined order, i.e. by avoiding to simultaneously supply all the portions of the network, allows avoiding any inert gas pressure drop at the inlet of the gas supply network of the machine, in a manner that the inert gas supply pressure is maintained above the minimum threshold value.

According to another characteristic, inert gas is supplied to the said portions according to a supply order determined according to the configuration of the pipe network in a manner as to maintain a positive supply flow in the direction of the turbine combustion chamber.

Favorably, the purge is stopped according to a sequence depending on the order of supply.

According to another characteristic, inert gas is injected in the portions of the fuel supply pipe marked with fuel supply control valves.

Inert gas can also be injected in the portions of fuel supply pipes marked with fuel supply control valves.

Moreover inert gas can be injected in one or each collector or distributors supplying the injectors with fuel.

In implementation mode, inert gas is injected in one or each collector or distributors for supplying the turbine with combustive fuel.

According to another characteristic of the process as per the invention, inert gas is injected at a pressure higher than the fuel gas pressure.

It is to be noted that additionally inert gas is injected at a pressure higher than the pressure of hot air present in a turbine compressor.

In implementation mode, the said portions are supplied with inert gas according to a supply order determined as per the configuration of the pipe network in a manner as to maintaining a positive supply flow in the direction of the turbine combustion chamber.

Moreover, it must be noted that inert gas is for example nitrogen or carbon dioxide.

BRIEF DESCRIPTION OF THE DRAWINGS

Other objectives, characteristics and advantages of the invention will appear while reading the following description, given as a non-limitative example, and referred to in the attached designs in which.

DETAILED DESCRIPTION OF THE INVENTION

As seen in FIGS. 2 to 5, a supply network of a gas turbine with fuel and combustive is likely to adopt several configurations.

In fact, the architecture of the supply network, and particularly the number of distributors (manifolds and cavities) likely to trap fuel or hot air depends on the nature of start-up fuel (gas or diesel).

In particular, it depends on the richness of fuel gas heating value.

In the case where the start-up fuel is diesel or liquid fuel, the supply pipe network can comprise of a hot air, diesel and synthetic gas supply pipe. In this configuration, the network additionally has a cavity likely to contain synthetic gas, a synthetic gas supply distributor and a cavity likely to contain hot air.

Moreover, if start-up fuel gas is natural gas, the supply network can comprise of a hot air, natural gas and synthetic gas supply pipe.

Thus, various configurations are possible.

Various configurations of the supply network can be determined according to the variations of the heating value of fuel gas.

It is to be noted in this regard that the characteristics of composition and temperature of a fuel can be characterized by a reference parameter called "Modified Wobbe index" (MWI). The MWI allows comparison of volumetric energy of different gases, at different temperatures. It concerns a measure of interchangeability of gaseous fuel for a system design. This term is used as a relative measure of energy injected in the burner at a fixed pressure ratio, calculated by using the net calorific value of fuel, the density compared to the air and combustive temperature. The mathematical definition is as follows:

$$MWI = \frac{LHV}{\sqrt{Sg * T}}$$

in which

LHV describes the net calorific value of gas (Btu/scf), Sg describes the density of gas with regard to air, and T refers to its absolute temperature (° Rankine).

The various configurations of the supply network are selected according to a gas comparison carried out from the ratio between their Modified Wobbe Index.

In particular, a comparison of gas is carried out by calculating the following ratio:

$$MWI_{ratio} = \frac{MWI_{gaznat}}{MWI_{syngaz}}$$

in which $MWI_{gaznat}$ refers to the Modified Wobbe Index of natural gas, and $MWI_{syngaz}$ refers to the Wobbe index of synthetic gas.

In this regard, it is to be noted that natural gas is a gas called rich, whereas synthetic gas is a gas called lean.

Figure 1:
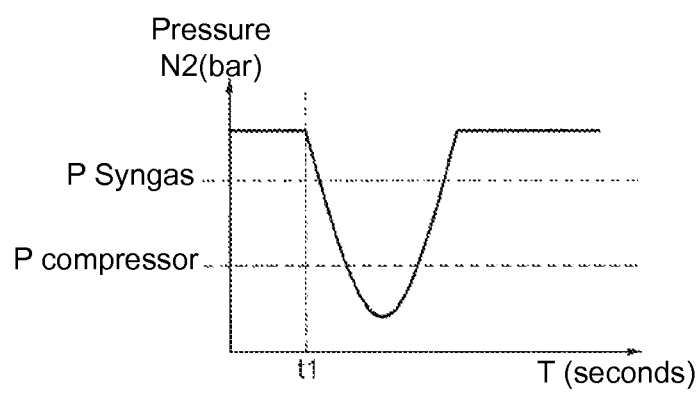
FIG. 1, already mentioned, illustrates the inert gas pressure variation when all the portions of the supply network are simultaneously purged.
Figure 2:
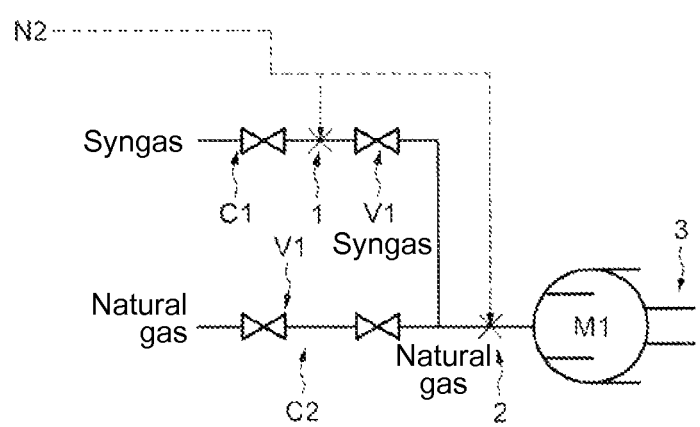
FIGS. 2 to 5 illustrate four examples of configuration of a supply network in which a sequence of purges is implemented.

Thus, for example, by referring to FIG. 2 (configuration 1), for a MWI_ratio to the order of 1, a Config 1 configuration will be used which has a synthetic supply pipe C1, a natural gas supply pipe C2, each one fitted with valves such that V1 of the synthetic gas and natural gas supply control, respectively, and comprising of a cavity 1, marked with two V1 control valves and likely to trap the synthetic gas, a cavity 2 and an M1 distributor or supply manifold of the 3 injectors with fuel.

Figure 3:
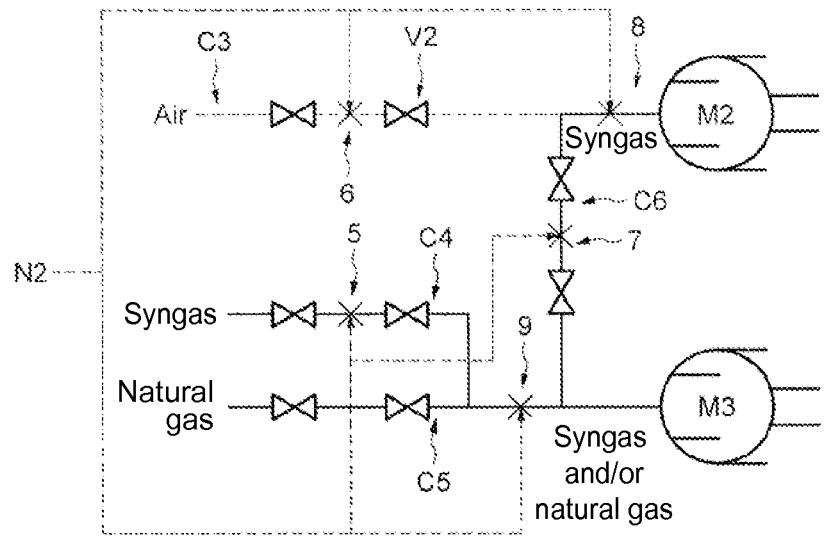

Moreover, for a ratio MWIratio lying between 1 and 5 approximately, as illustrated in FIG. 3 (configuration 2), thus two M2 and M3 distributors will be used one dedicated to the supply of synthetic gas and the other to the supply of natural gas. In the case where the fuel is synthetic gas, the two distributors M2 and M3 are used. In the case where the fuel is of natural gas, only the M3 distributor is used. In the case where the fuel is a mixture of synthetic gas and natural gas, the two distributors M2 and M3 are used.

According to this configuration Config 2, the supply pipe network bears a C3 hot air supply pipe, a C4 synthetic gas supply pipe and a C5 natural gas supply pipe, in which the C4 synthetic gas supply pipe is opened.

According to this configuration Config 2, a diversion C6 allows supplying the second M2 distributor with synthetic gas, natural gas or a mixture of the two gases.

Moreover, this configuration bears a synthetic gas cavity 5, a hot air cavity 6, a fuel cavity 7, each one marked with a portion of the pipe located between two valves V2. Moreover this configuration bears a distributor M2 and M3 with a volume to purge 8 and 9 respectively.

Figure 4:
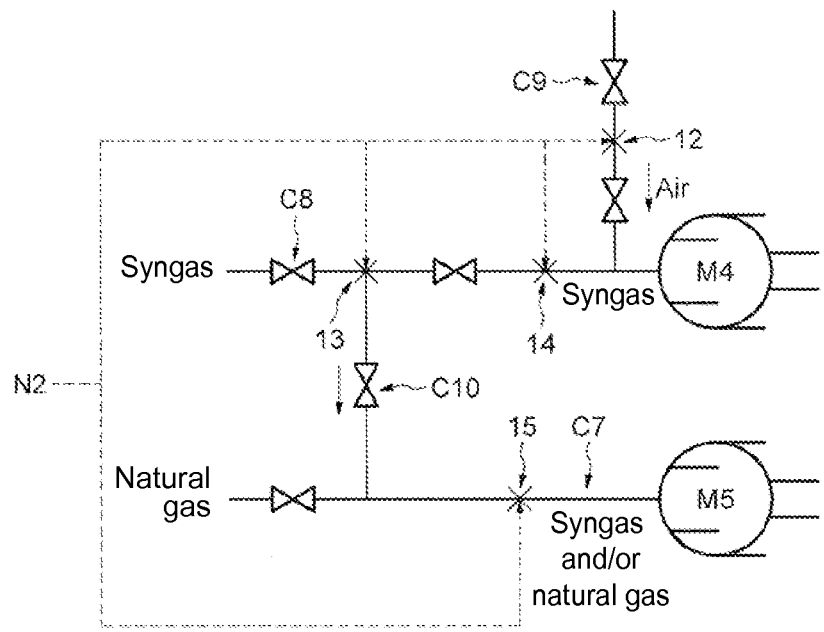

According to another configuration, visible in FIG. 4, the supply network, which also bears two distributors M4 and M5 dedicated respectively to the supply with synthetic gas and synthetic gas and/or natural gas, the pipe network has a first pipe C8 for supply of synthetic gas, a second pipe C7 for supply of natural gas and/or synthetic gas, a third pipe C9 for supply of hot air, which opens in the first pipe C8, as well as a transfer pipe C10 extending between the first and the second pipes C8 and C7.

Thus, this network bears a hot air cavity 12, a synthetic gas cavity 13, a volume 14 to purge corresponding to the distributor M4, as well as a volume 15 corresponding to the distributor M5. This configuration Config 3 corresponds to a ratio MWIratio lying between 5 and 13, i.e. very low synthetic gas.

Figures 5, 6:
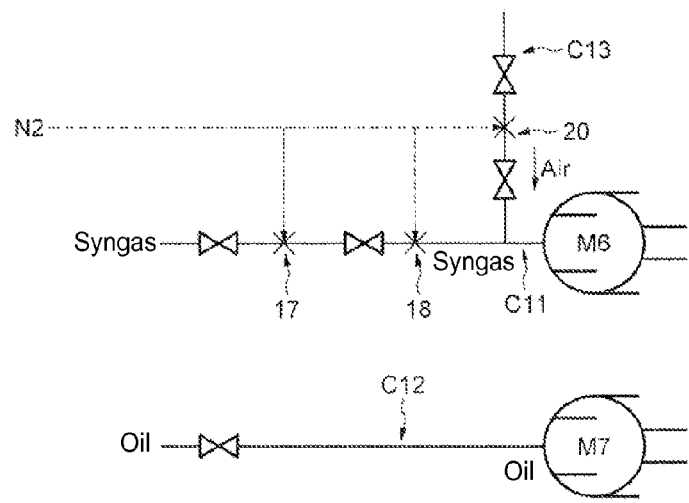
FIG. 6 is a table illustrating an example of purge sequence, according to the different configurations of the network and their operating modes.

With reference to FIG. 5, the configuration Config 4 is based on the use of two supply pipes C11 and C12 for the supply of synthetic gas and diesel, respectively, and the two distributors M6 and M7 for supply of synthetic gas and diesel, respectively.

In this case, a third pipe C13 for supply of hot air is connected to the first pipe C11 for supply of synthetic gas.

It is observed that, during this configuration, the pipe C11 for supply of synthetic gas bears a cavity 17 and a volume to purge 18 corresponding to the distributor M6, whereas the pipe C13 for supply of air bears a cavity 20.

With reference to FIG. 6, according to the four previously described configurations, we proceed with purge phases according to the inert gas sequential injections, in the instance of N2 or CO2.

Moreover, it concerns causing the injection of inert gas in portions of the network likely to contain fuel and/or hot air (cavities or distributors), according to a predetermined order, in order to avoid simultaneous supply of all these portions of the pipe.

The inert gas purge sequences of the various cavities and volumes of distributors, can be realized during the various transitory events, particularly during start up, during a change of mode of supply of natural gas towards a synthetic gas supply (transfer in), during a change of mode of supply from a synthetic gas supply mode to a natural gas supply mode (transfer out), on shutdown and during emergency stop (trip).

In the table of FIG. 6, examples of purge sequences are indicated, for each one of the configurations Config 1, . . . Config 4, and for each one of the events requiring a purge. For each configuration, and for each event, the event Ii corresponds to a inert gas injection phase in the portions of pipe or, in general of the supply network illustrated in the FIGS. 2 to 5.

Figure 7:
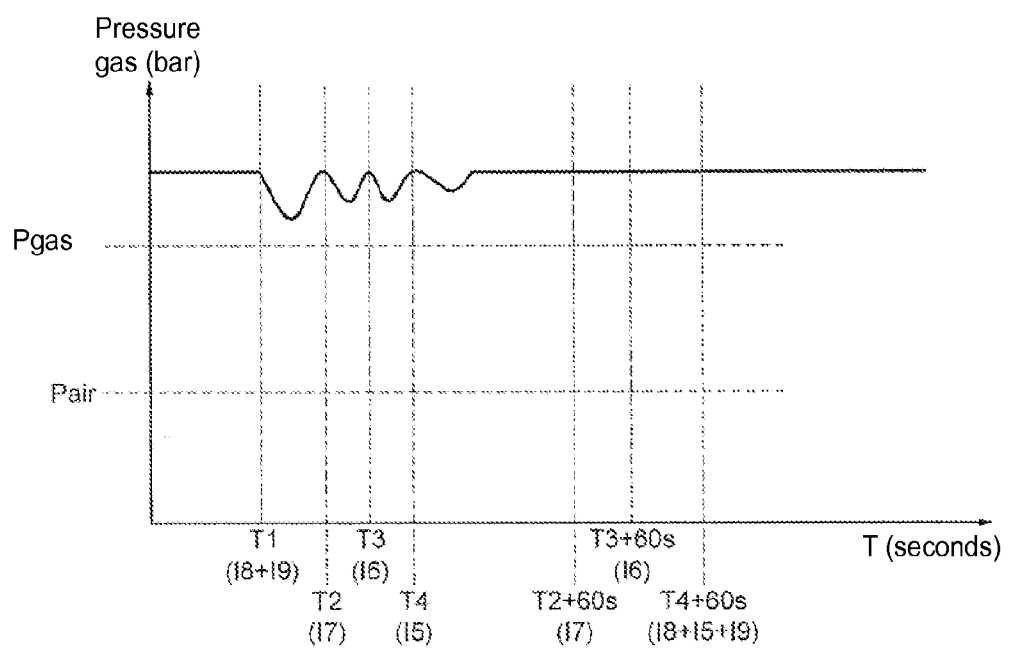
FIG. 7 shows the change in inert gas pressure upstream of the supply network during implementation of the purge sequence (opening and closing of the cavities) for the configuration of FIG. 3, in operation mode called "TRIP/Start Up".

Thus, by referring to FIG. 7, for example, for a configuration Config 2, and in emergency stop or normal start up operating mode (trip/start up), the purge sequence starts at an instance T1 by purge of the simultaneous distributor volumes of cavities 8 and 9 (implementation of injection phases 18 and 19). At the instance T2, the cavity 7 is purged (injection phase I7). At the instance T3, the cavity 6 is purged (injection phase I6).

Finally, at the instance T4, the cavity 5 is purged (injection phase I5).

For stopping of the purge, the closure of the inert gas supply valves starts, for example, at the instance T2+x seconds, with the closure of cavity 7, then of cavity 6 in T3+x seconds, then in T4+x seconds, of cavities 5, 8 and 9. For example, x is equal to 60. Thus, the stop sequence depends on that of implementation of purge.

As seen in FIG. 7, thanks to the implementation of the sequential purge, the inert gas pressure variations are considerably limited, and in particular, it is ensured that the inert gas pressure remains greater than the fuel gas and hot air pressure.

What is claimed is:

1. A purge process of a supply pipe network in a gas turbine comprising:
   supplying a fuel to a supply pipe network in a gas turbine, the fuel at least partly contains synthetic gas,
   stopping supplying the fuel to the supply pipe network;
   while the supply of fuel is stopped, injecting inert gas in a sequential order in each of separate portions of the supply pipe network that contains fuel or hot air,
   wherein the sequential order of injection of the inert gas includes injecting the inert gas in a first of the separate portions while a second of the separate portions is not injected with the inert gas, and subsequently injecting the inert gas in the second of the separate portions, the sequential order is determined by a Modified Wobbe Index of the fuel, and
   after the sequential order of injection of the inert gas, resuming the supply of the fuel to the supply pipe network.

2. The purge process according to claim 1, wherein the inert gas is supplied to the separate portions of the supply pipe network according to a supply order determined according to a configuration of the supply pipe network in a manner as to maintain a positive supply flow towards a direction of a turbine combustion chamber in the gas turbine.

3. The purge process according to claim 2, further comprising stopping the purge process according to a sequence depending on the supply order.

4. The purge process according to claim 1 further comprising fuel supply pipes in the supply pipe network, wherein the inert gas is injected in portions of the fuel supply pipes located between fuel supply control valves.

5. The purge process according to claim 1, further comprising hot air supply pipes in the supply pipe network, wherein the inert gas is injected in portions of the hot air supply pipes located between hot air supply control valves.

6. The purge process according to claim 1, further comprising collectors that supply the injectors with fuel, wherein the inert gas is injected in one or each collector for supply of the injector with fuel.

7. The purge process according to claim 1, further comprising collectors that supply the injectors with fuel, wherein the inert gas is injected in one or each collector for supply of the turbine with combustive fuel.

8. The purge process according to claim 1, wherein the inert gas is injected at a pressure greater than a combustible gas pressure.

9. The purge process according to claim 1, wherein the inert gas is injected at a pressure greater than a pressure of hot air present in a turbine compressor.

10. The purge process according to claim 1, wherein the inert gas is nitrogen or carbon dioxide.

* * * * *